(12) United States Patent
Oh

(10) Patent No.: US 12,203,582 B2
(45) Date of Patent: Jan. 21, 2025

(54) CORRUGATED PIPE FOR HIGH PRESSURE HAVING A METAL BRAIDED NET

(71) Applicant: Kofulso Co., Ltd., Incheon-si (KR)

(72) Inventor: Seung-il Oh, Seoul (KR)

(73) Assignee: KOPULSO CO., LTD., Seoul (KR)

( * ) Notice: Subject to any disclaimer, the term of this patent is extended or adjusted under 35 U.S.C. 154(b) by 279 days.

(21) Appl. No.: 18/069,470

(22) Filed: Dec. 21, 2022

(65) Prior Publication Data

US 2024/0133507 A1 Apr. 25, 2024
US 2024/0230015 A9 Jul. 11, 2024

(30) Foreign Application Priority Data

Oct. 25, 2022 (KR) .................. 10-2022-0137951

(51) Int. Cl.
*F16L 11/15* (2006.01)
*F16L 57/02* (2006.01)

(52) U.S. Cl.
CPC .............. *F16L 57/02* (2013.01); *F16L 11/15* (2013.01)

(58) Field of Classification Search
CPC .... F16L 33/207; F16L 27/111; Y10S 285/903
USPC .......... 138/121, 122, 109; 285/289.1, 288.1, 285/382, 226, 903, 301; 29/508
See application file for complete search history.

(56) References Cited

U.S. PATENT DOCUMENTS

| | | | |
|---|---|---|---|
| 2,473,879 A | 6/1949 | Guarnaschelli | |
| 3,023,496 A | 3/1962 | Millar | |
| 4,089,351 A * | 5/1978 | Ward | F16L 13/02 |
| | | | 138/109 |
| 4,869,420 A | 9/1989 | Kessler, Jr. | |
| 5,069,253 A * | 12/1991 | Hadley | F16L 11/12 |
| | | | 138/121 |
| 5,297,586 A | 3/1994 | McIntosh | |
| 5,499,439 A | 3/1996 | Zaborszki et al. | |
| 5,660,419 A | 8/1997 | Kim | |
| 5,819,807 A | 10/1998 | Reed | |
| 6,016,842 A | 1/2000 | Rooke | |
| 6,845,559 B2 | 1/2005 | Choi | |
| 7,104,285 B2 * | 9/2006 | Furuta | F16L 11/118 |
| | | | 138/131 |
| 7,114,526 B2 * | 10/2006 | Takagi | F16L 11/15 |
| | | | 138/143 |
| 11,549,619 B2 * | 1/2023 | Zaborszki | F16L 33/26 |
| 11,708,921 B2 * | 7/2023 | Zaborszki | F16L 13/0236 |
| | | | 285/288.11 |
| 2004/0020545 A1 * | 2/2004 | Takagi | F16L 33/2076 |
| | | | 138/109 |

* cited by examiner

*Primary Examiner* — Patrick F Brinson
(74) *Attorney, Agent, or Firm* — Jacobson Holman PLLC

(57) ABSTRACT

A corrugated pipe for high pressure having a metal braided net, which includes a joining portion formed to be twice as thick as a corrugated pipe when a valley and a crest of an end portion of the corrugated pipe are compressed to form a flat radial surface, a connector welded to the joining portion, and a coupling ring compressed on the connector, so that the thickness of the welded portion of the corrugated pipe is doubled, and the portion where the coupling ring is compressed is formed on the groove portion of the connector.

1 Claim, 3 Drawing Sheets

CORRUGATED PIPE FOR HIGH PRESSURE HAVING A METAL BRAIDED NET

BACKGROUND OF THE INVENTION

Field of the Invention

The present invention relates to a corrugated pipe for high pressure having a metal braided net as a reinforcing means for preventing the corrugated pipe from stretching due to an action of high pressure.

Background Art

In general, a corrugated pipe has an advantage in that it can be bent freely within a limited space, thereby allowing easy pipe work. However, in a case in which a high pressure of 17 kg/cm2 or more is applied to the inside of the corrugated pipe, the corrugated portion is stretched and may be cracked or ruptured. For this reason, a corrugated pipe for high pressure uses a braided net woven with a metallic steel wire as a reinforcing means.

As illustrated in FIG. 1, a conventional art for fixing a braided net to a corrugated pipe includes: a corrugated pipe 1-1 having a straight pipe part 1-2 formed at an end portion and retaining protrusion 1-3 formed on the straight pipe part 1-2; an inner coupling ring 1-4 into which the straight pipe part 1-2 is inserted to the retaining protrusion 1-3 and on which an end portion 1-6 of a metal braided net 1-5 is covered; and an outer coupling ring 1-7 mounted on the end portion 1-6 of the braided net 1-5 and compressed inwardly to fix the braided net 1-5.

However, the conventional art has several disadvantages in that the straight pipe part 1-2 having thickness of 0.3 mm to 0.4 mm is pressurized and deformed or stress is generated while the outer coupling ring 1-7 is compressed, in that the working process is complicated since the straight pipe part 1-2 is bent from the corrugated pipe 1-1, and in that manufacturing costs are increased since lots of components are required.

FIG. 2 illustrates another conventional art in which a braided net is fixed to a corrugated pipe.

As illustrated in the drawing, a braided net 2-5 is covered on a straight pipe part 2-2 of the corrugated pipe 2-1 and a welding ring 2-8 is inserted into an end of the braided net 2-5 so as to weld the corrugated pipe 2-1, the braided net 2-5, and the welding ring 2-8.

However, such a welding method has a disadvantage in that a skilled worker must weld manually since the straight pipe part 2-2 having thickness of 0.3 mm to 0.4 mm may be damaged by welding heat of 1,400 to 1,500° C.

U.S. Pat. No. 6,845,559, as illustrated in FIG. 3, discloses a method for fixing a braided net to a corrugated pipe comprising tying an end portion of a braided net 3-5 to a corrugated pipe 3-1 using a steel wire 3-9, applying a brazing agent 3-10 in a paste state, fusing and welding the welding material 3-10 while treating heat of 1,000 to 1,200° C., and untying and removing the steel wire 3-9.

However, the conventional method using the steel wire and the brazing agent has a fatal defect that the brazing agent 3-10 easily falls off when a high pressure repeatedly acts on the corrugated pipe 3-1.

Moreover, since welding heat of 1,000 to 1,200° C. acts on the straight pipe part 3-2 having the thickness of only 0.3 to 0.4 mm, the straight pipe part 3-1 may be damaged by heat. Furthermore, there was a problem in that productivity was lowered because the steel wire must be removed after heat treatment in a state in which it is tied.

In order to solve the problem of the conventional art that the corrugated pipe is damaged by welding heat and compression force by providing a means for increasing the thickness of the welded portion of the corrugated pipe having the thickness of 0.3 mm to 0.4 mm and preventing the coupling ring from being compressed on the corrugated pipe, the present invention was devised.

SUMMARY OF THE INVENTION

Accordingly, the present invention has been made to solve the above-mentioned problems occurring in the prior art, and it is an object of the present invention to provide a corrugated pipe for high pressure having a metal braided net, which includes a joining portion formed to be twice as thick as a corrugated pipe when a valley and a crest of an end portion of the corrugated pipe are compressed to form a flat surface, a connector welded to the joining portion, and a coupling ring compressed on the connector, so that the thickness of the welded portion of the corrugated pipe having the thickness of only 0.3 mm to 0.4 mm is doubled, and the portion where the coupling ring is compressed is formed not on the corrugated pipe which is fragile but on the groove portion of the connector, thereby solving the problem that the corrugated pipe is damaged by welding heat and compression force.

To accomplish the above object, according to the present invention, there is provided a corrugated pipe for high pressure having a metal braided net including: a joining portion formed to be twice as thick as a corrugated pipe when a valley and a crest of an end portion of the corrugated pipe are compressed to form a flat surface; a connector having a welded surface of which one end surface touches the joining portion, a pressing portion formed in front of the welding surface to coincide with the inner diameter of the valley, and a groove portion formed on the outer face; a welded portion where an outer circumferential portion of the joining portion is welded round in a state in which the joining portion and the welded surface touches each other; a coupling ring compressed onto the groove portion to integrate a braided net covered on the corrugated pipe to the connector; and a cutter insertion space formed between the groove portion and the coupling ring in the state in which the coupling ring is compressed.

The corrugated pipe for high pressure having a metal braided net according to the present invention can solve the problem that the corrugated pipe is damaged by welding heat and compression force, since the thickness of the welded portion of the corrugated pipe 10 having the thickness of only 0.3 mm to 0.4 mm is doubled, and the portion where the coupling ring 50 is compressed is formed not on the corrugated pipe which is fragile but on the groove portion of the connector.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

With reference to the accompanying drawings, detailed contents for carrying out the present invention will be described as follows.

Figure 4:
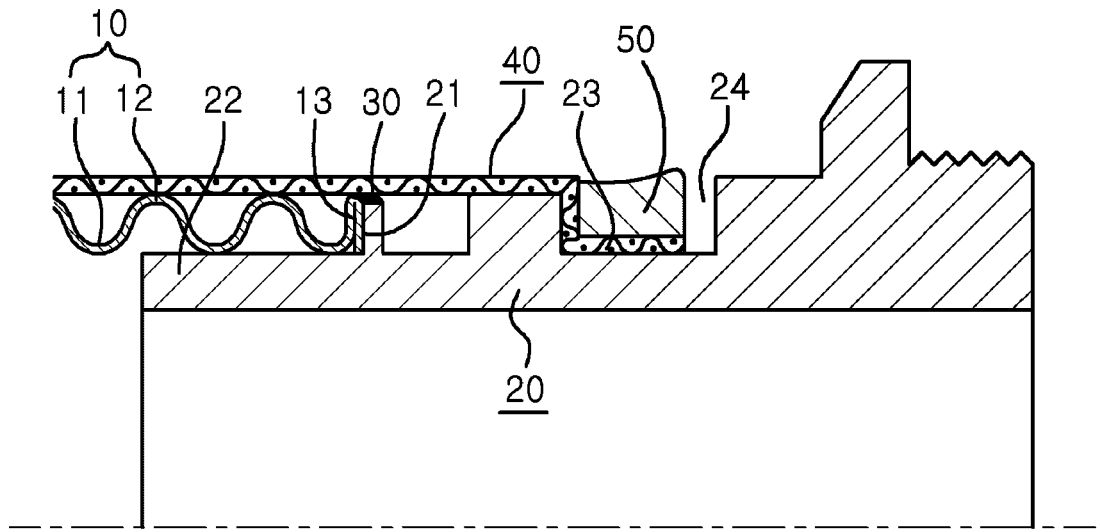
FIG. 4 is a sectional view illustrating a braided net fixing structure according to an embodiment of the present invention.

As illustrated in FIG. 4, a corrugated pipe for high pressure having a metal braided net according to an embodiment of the present invention includes: a joining portion 13 formed to be twice as thick as a corrugated pipe when a valley 11 and a crest 12 of an end portion of the corrugated pipe 10 are compressed to form a flat surface; a connector 20 having a welded surface 21 of which one end surface touches the joining portion 13, a pressing portion 22 formed in front of the welding surface 21 to coincide with the inner diameter of the valley 11, and a groove portion 23 formed on the outer face of the connector; a welded portion 30 where an outer circumferential portion of the joining portion 13 is welded round in a state in which the joining portion 13 and the welded surface 21 touches each other; a coupling ring 50 compressed onto the groove portion 23 to integrate a braided net covered on the corrugated pipe 10 to the connector 20; and a cutter insertion space 24 formed between the groove portion 23 and the coupling ring 50 in the state in which the coupling ring 50 is compressed.

The corrugated pipe 10 may be made of STS 304, which is a stainless material. STS 304 means stainless steel containing 0.08% or less of C, 0.5 to 0.75% of Si, 0.035% or less of P, 8.00 to 15.00% of Ni, and 17.00 to 18.00% of Cr.

The joining portion 13 is formed in such a way that the valley 11 and the crest 12 of the end portion of the corrugated pipe 10 are compressed to be folded so that the end of the corrugated pipe 10 is formed to be a flat radial surface. Accordingly, a portion to which welding heat is applied is formed to be 0.6 mm to 0.8 mm which is twice as thick as the corrugated pipe 10, thereby preventing the corrugated pipe 10 from being damaged by welding heat.

Figure 1:
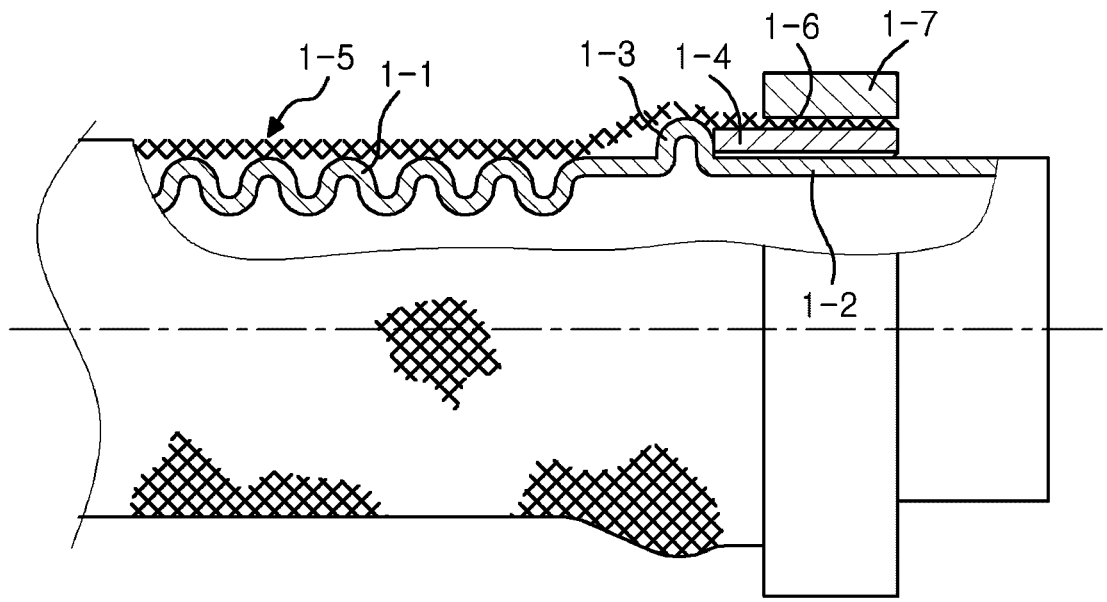
FIG. 1 is a view illustrating prior art fixing a braided net using inner and outer coupling rings.
Figure 2:
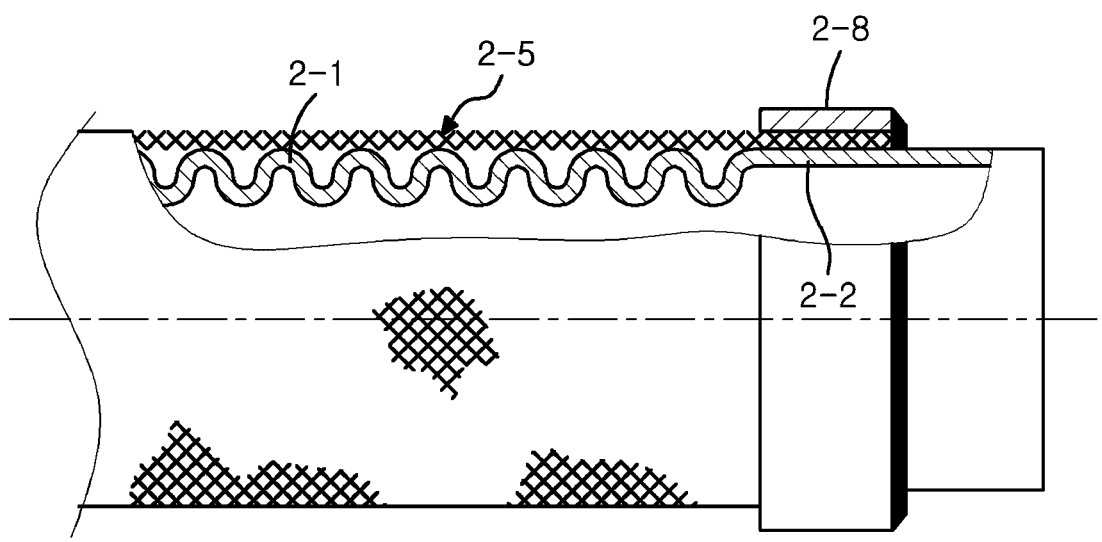
FIG. 2 is a view illustrating prior art fixing a braided net by welding.
Figure 3:
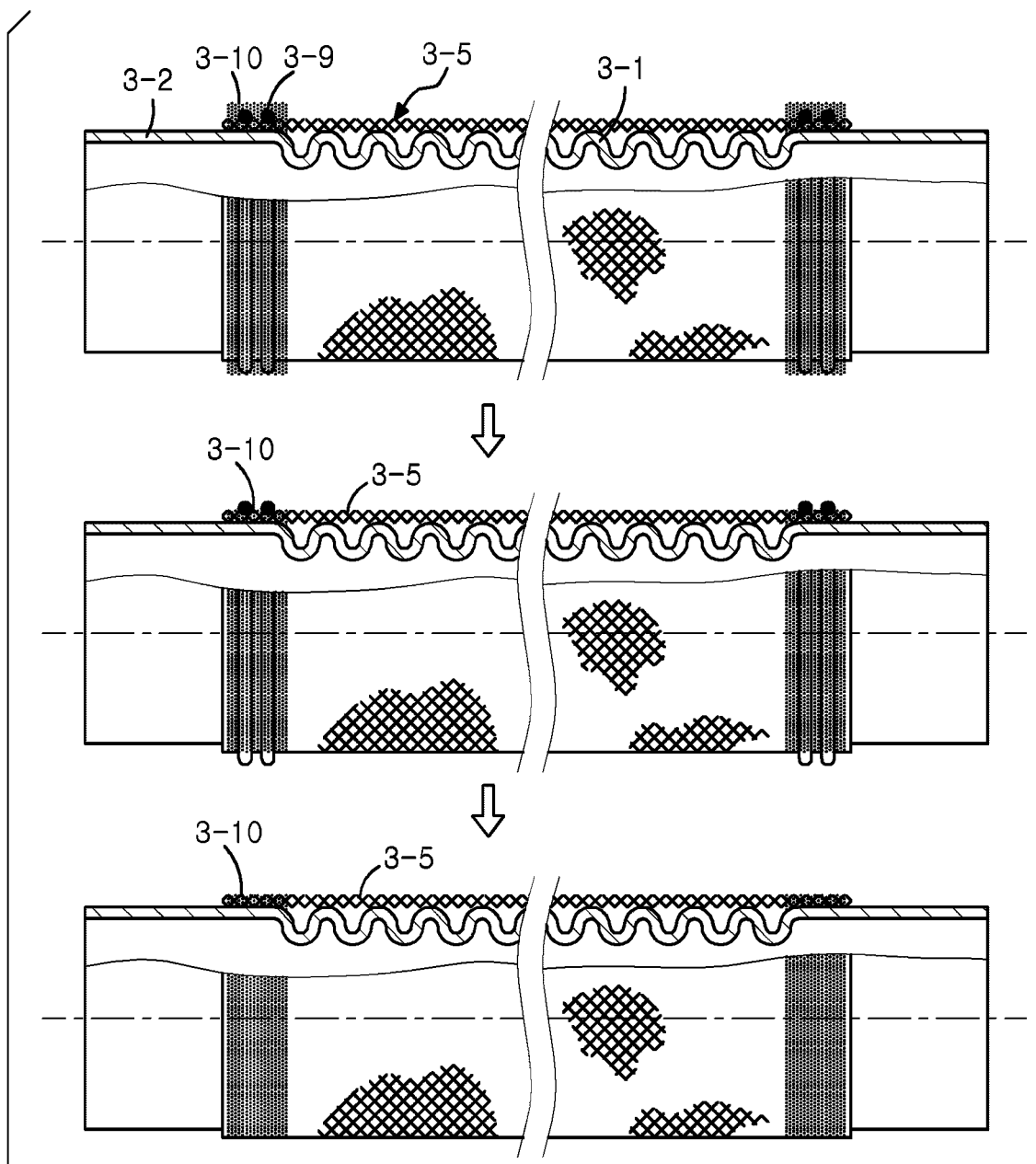
FIG. 3 is a view illustrating prior art fixing a braided net by a steel wire and a brazing agent.

Unlike the conventional arts illustrated in FIGS. 1 to 3, the present invention does not need a straight pipe part to fix the braided net.

When the pressing portion 22 is pressed into the valley 11, the welded surface 21 comes into close contact with the joining portion 13 without using a jig so that a worker can easily perform welding work.

The welded portion 30 formed in the state in which the welded surface 21 gets in close contact with the joining portion 13 is formed round to prevent damage of the braided net 40 covering the corrugated pipe 10.

After the braided net 40 is over the groove portion 23, when the coupling ring 50 is fit and compressed, an end portion of the braided net 40 pressed into the groove portion 23 by the coupling ring 50.

In this instance, since the coupling ring 50 is narrower than the groove portion 23, a cutter insertion space 24 into which a cutter 60 can be inserted is formed between the groove portion 23 and the coupling ring 50.

Figure 5:
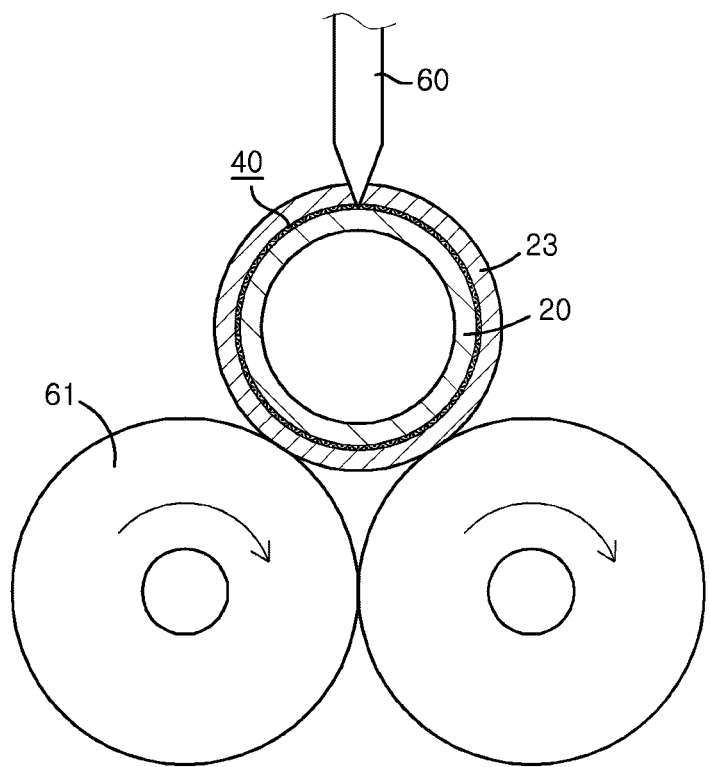
FIG. 5 is a view illustrating a process of cutting an end portion of a braided net of the present invention with a cutter.

FIG. 5 is a view illustrating a state in which the cutter 60 is inserted into the cutter insertion space 24 and cuts the braided net 40 sticking out of the coupling ring 50. In FIG. 5, a pair of rollers 61 serve to rotate the corrugated pipe 10.

Of course, the connector 20 may have a nut, a bolt or the like on which a screw portion or a spiral hole is formed as a connecting means besides a one-touch joint means.

In the present invention as described above, the thickness of the welded portion of the corrugated pipe 10 having the thickness of only 0.3 mm to 0.4 mm is doubled, and the portion where the coupling ring 50 is compressed is formed not on the corrugated pipe which is fragile but on the groove portion 23 of the connector 20, thereby solving the problem that the corrugated pipe is damaged by welding heat and compression force.

Although the present invention has been described in detail with reference to the accompanying drawings, the present invention is not limited thereto, and various changes are possible without departing from the technical spirit of the present invention.

What is claimed is:

1. A corrugated pipe for high pressure having a metal braided net, the corrugated pipe comprising:
   a joining portion formed to be twice as thick as the corrugated pipe when a valley and a crest of an end portion of the corrugated pipe are compressed to form a flat radial surface;
   a connector having a welded surface of which one end surface touches the joining portion, a pressing portion formed in front of the welding surface to coincide with the inner diameter of the valley, and a groove portion formed on the outer face of the connector;
   a welded portion where an outer circumferential portion of the joining portion is welded round in a state in which the joining portion and the welded surface touch each other;
   a coupling ring compressed into the groove portion to secure the metal braided net covering the corrugated pipe to the connector; and
   a cutter insertion space formed between the groove portion and the coupling ring after the coupling ring is compressed.

* * * * *